United States Patent
Keys et al.

(10) Patent No.: US 8,625,113 B2
(45) Date of Patent: Jan. 7, 2014

(54) SYSTEM AND METHOD FOR DISTRIBUTED OPTICAL CHARACTER RECOGNITION PROCESSING

(75) Inventors: Gregory C. Keys, Warwick, NY (US); Andrew G. Jennings, Boonton, NJ (US); Hiroshi Kitada, Tuckahoe, NY (US)

(73) Assignees: Ricoh Company Ltd, Tokyo (JP); Ricoh Americas Corporation, West Caldwell, NJ (US)

( * ) Notice: Subject to any disclaimer, the term of this patent is extended or adjusted under 35 U.S.C. 154(b) by 623 days.

(21) Appl. No.: 12/889,927

(22) Filed: Sep. 24, 2010

(65) Prior Publication Data
US 2012/0075648 A1    Mar. 29, 2012

(51) Int. Cl.
  G06K 15/02    (2006.01)
  G06K 15/00    (2006.01)
  G06K 1/00    (2006.01)
  G06F 3/12    (2006.01)
  G06F 15/00    (2006.01)

(52) U.S. Cl.
  USPC ......... 358/1.11; 358/1.15; 358/1.17; 358/1.2; 358/1.9; 358/1.1

(58) Field of Classification Search
  None
  See application file for complete search history.

(56) References Cited

U.S. PATENT DOCUMENTS

| | | | | |
|---|---|---|---|---|
| 6,914,697 | B2 * | 7/2005 | Hamura et al. | 358/1.17 |
| 7,386,511 | B2 * | 6/2008 | Buchanan et al. | 705/45 |
| 7,580,151 | B2 * | 8/2009 | Kurose et al. | 358/1.9 |
| 2004/0179230 | A1 * | 9/2004 | Kitada et al. | 358/1.15 |
| 2005/0046878 | A1 * | 3/2005 | Kido | 358/1.2 |
| 2005/0105127 | A1 * | 5/2005 | Miwa et al. | 358/1.15 |
| 2006/0187484 | A1 * | 8/2006 | Noda | 358/1.15 |
| 2006/0209343 | A1 * | 9/2006 | Wanda et al. | 358/1.15 |
| 2008/0184236 | A1 * | 7/2008 | Yamauchi et al. | 718/100 |
| 2010/0328684 | A1 * | 12/2010 | Cain | 358/1.2 |
| 2012/0120438 | A1 * | 5/2012 | Sato | 358/1.15 |

* cited by examiner

*Primary Examiner* — Satwant Singh
(74) *Attorney, Agent, or Firm* — Oblon, Spivak, McClelland, Maier & Neustadt, L.L.P.

(57) ABSTRACT

A method and apparatus for processing a plurality of images. The method includes receiving or generating by an information processing apparatus the plurality of images. The plurality of images are stored in a memory, and separated into a plurality of image units. Sequence identifiers are assigned to the plurality of image units, and a first subset of the plurality of image units is processed by the information processing apparatus. The method further includes dividing the unprocessed plurality of image units into at least one second subset of the plurality of image units, and sending each of the at least one second subset of the plurality of image units to a different information processing apparatus for processing.

20 Claims, 12 Drawing Sheets

# SYSTEM AND METHOD FOR DISTRIBUTED OPTICAL CHARACTER RECOGNITION PROCESSING

BACKGROUND OF THE INVENTION

1. Field of the Invention

The present invention relates generally to distributed processing of images. The present invention is more particularly related to a system and method for distributing multipage optical character recognition processing among Multi-Functional Peripherals (MFPs) in a self-organizing computing cluster.

2. Description of the Related Art

MFPs are peripheral devices that perform multiple document-centric functions, typically scanning, copying, printing, and faxing. MFPs usually have networking capabilities and businesses typically have tens or hundreds of MFP hosts on the same network.

An MFP is commonly used to perform Optical Character Recognition (OCR) on documents that are scanned into it or transmitted to it. A general overview of OCR is discussed in Sami Lais, *QuickStudy: Optical Character Recognition*, ComputerWorld, on the world wide web at computerworld.com/s/article/73023/Optical_Character_Recognition, which is incorporated herein by reference. OCR generally refers to the capability of a computer software to translate images containing words into a format that a person can use, for example, edit, retrieve, search, index, and/or store. To OCR refers to the act of the computer converting an image into the format that the person can use, such as electronically translating images into machine-readable text.

These images might be hand-written or printed text, or other machine-readable representations of data such as a barcode. OCR processing is typically resource-intensive on the MFP, so users who attempt OCR on a large multipaged document must often wait tens of seconds or minutes for the job to complete. This wait time often blocks the MFP from use by others as well.

SUMMARY OF THE INVENTION

The present invention takes advantage of networked MFPs to greatly reduce the time it takes to complete a multipage OCR job. The present invention creates a way to distribute subsets of an OCR task (or job) among MFPs and then recombine the processed results on the MFP originating the job. It does this by creating a self-organizing computing cluster with a tree-structured topology, in which MFPs on the same tree level parallel process OCR subsets.

Accordingly, the time to process a multipage OCR job is reduced significantly. This reduction is a result of parallel processing among MFPs on the same level as the tree structure that results in this system. The tree-structured computer cluster that establishes parallel processing and its significant time gains to complete an OCR job is self-organizing and requires no human intervention or design.

According to an embodiment of the present invention, a method is provided for using an information processing apparatus to process a plurality of images. The method includes receiving or generating by an information processing apparatus the plurality of images. The plurality of images are stored in a memory, and separated into a plurality of image units. Sequence identifiers are assigned to the plurality of image units, and a first subset of the plurality of image units is processed by the information processing apparatus. The method further includes dividing the unprocessed plurality of image units into at least one second subset of the plurality of image units, and sending each of the at least one second subset of the plurality of image units to a different information processing apparatus for processing.

Further, according to another embodiment of the present invention, there is provided a method of using an information processing apparatus to process a plurality of images. The method includes receiving a plurality of image units corresponding to the plurality of images from another information processing apparatus. The plurality of image units are stored in a memory. The information processing apparatus processes a first subset of the plurality of image units, and divides the unprocessed plurality of image units into at least one second subset of the plurality of image units. Each of the at least one second subset of the plurality of image units is sent to a different information processing apparatus for processing. Further, the processed first subset of the plurality of image units is sent to a designated information processing apparatus.

According to another embodiment of the invention, there is provided an information processing apparatus. The information processing apparatus includes a memory configured to store a plurality of images. The first plurality of images are received or generated by the information processing apparatus. The information processing apparatus also includes at least one processor that is configured to separate the plurality of images into a first plurality of image units, to assign sequence identifiers to the first plurality of image units, to receive a second plurality of image units, to process a first subset of one of the first and second plurality of image units, and to divide the one of the unprocessed first and second plurality of image units into at least one second subset of the one of the first and second plurality of image units. Further, the information processing apparatus includes a sending unit configured to send each of the at least one second subset of the one of the first and second plurality of image units to a different information processing apparatus for processing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
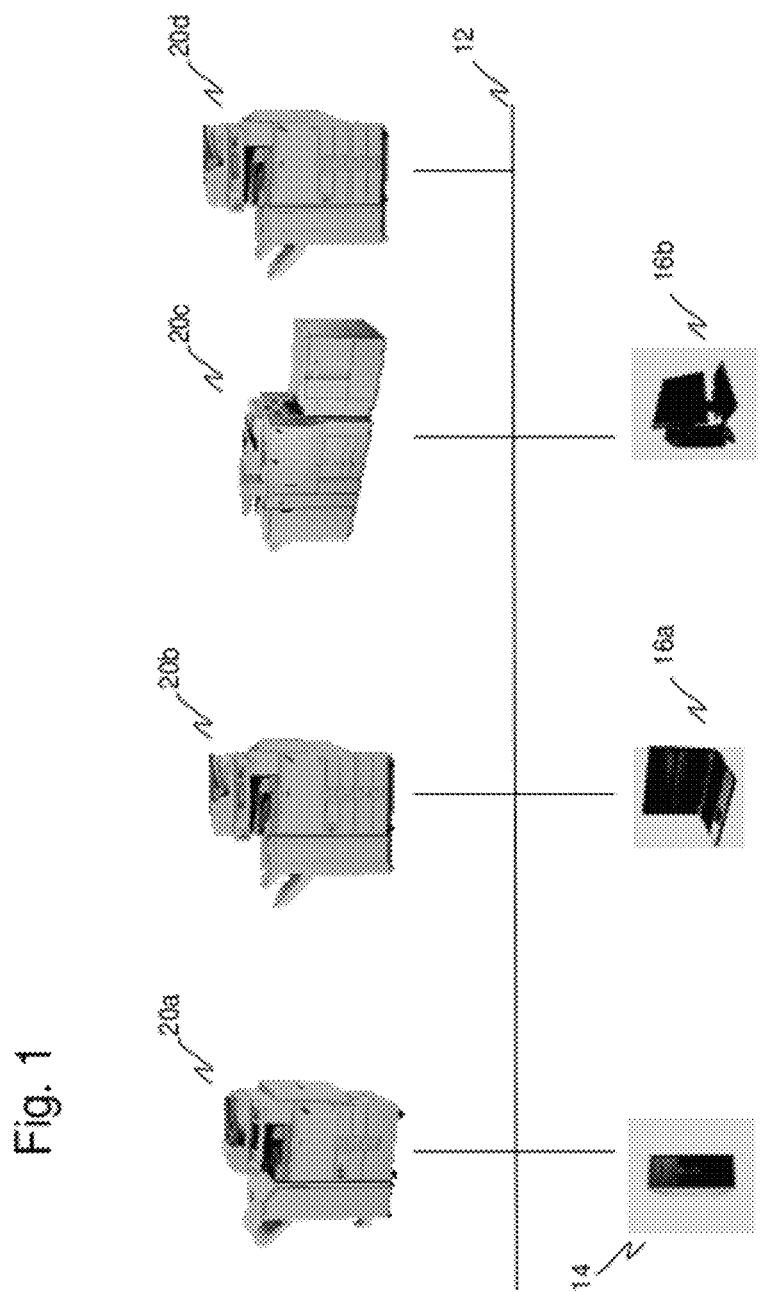
FIG. 1 illustrates an exemplary distributed OCR system including MFPs, a server, and client devices.

Referring now to the drawings, wherein like reference numerals designate identical or corresponding parts throughout the several views, FIG. 1 shows an exemplary distributed OCR processing system including a server 14, client devices 16a and 16b (e.g., a portable computer, desktop computer, etc.), and MFPs 20a-20d connected over a network 12, such as a Local Area Network (LAN), Wide Area Network (WAN), or Wireless Local Area Network (WLAN).

It is noted, however, that the server 14, client devices 16a and 16b, and MFPs 20a-20d need not be connected to each other over the same network and may, for example, be connected to each other by any one or a combination of different communication paths (e.g., the Internet, a LAN, or a mobile network). Further, the number and types of devices connected to the network 12 are not limited to the devices illustrated in FIG. 1. For example, other image capture or storage devices such as a mobile phone, scanner, still and/or video camera, etc., may be connected to the network 12 to provide image data for OCR processing.

The MFPs 20a-20d are exemplary devices on which an embodiment of the distributed OCR processing may be performed. A distributed OCR job originates at one of the MFPs 20a-20d. Each of the remaining MFPs 20a-20d, participating in processing the distributed OCR job, processes a subset of the image data associated with the OCR job. In one embodiment, the image data corresponds to one or a plurality of images scanned by the MFP from which the distributed OCR job originates. In one embodiment, the OCR job may refer to the output of a device acting in collaboration with a user and a user's input, and is a collection of metadata and scanned documents. In another embodiment, the image data may be submitted by, or retrieved from, the server 14, the client devices 16a and 16b, another MFP, or another image capture or storage device. Alternatively, the image data may be e-mailed or otherwise uploaded to the MFP from which the distributed OCR job originates.

Figure 2:
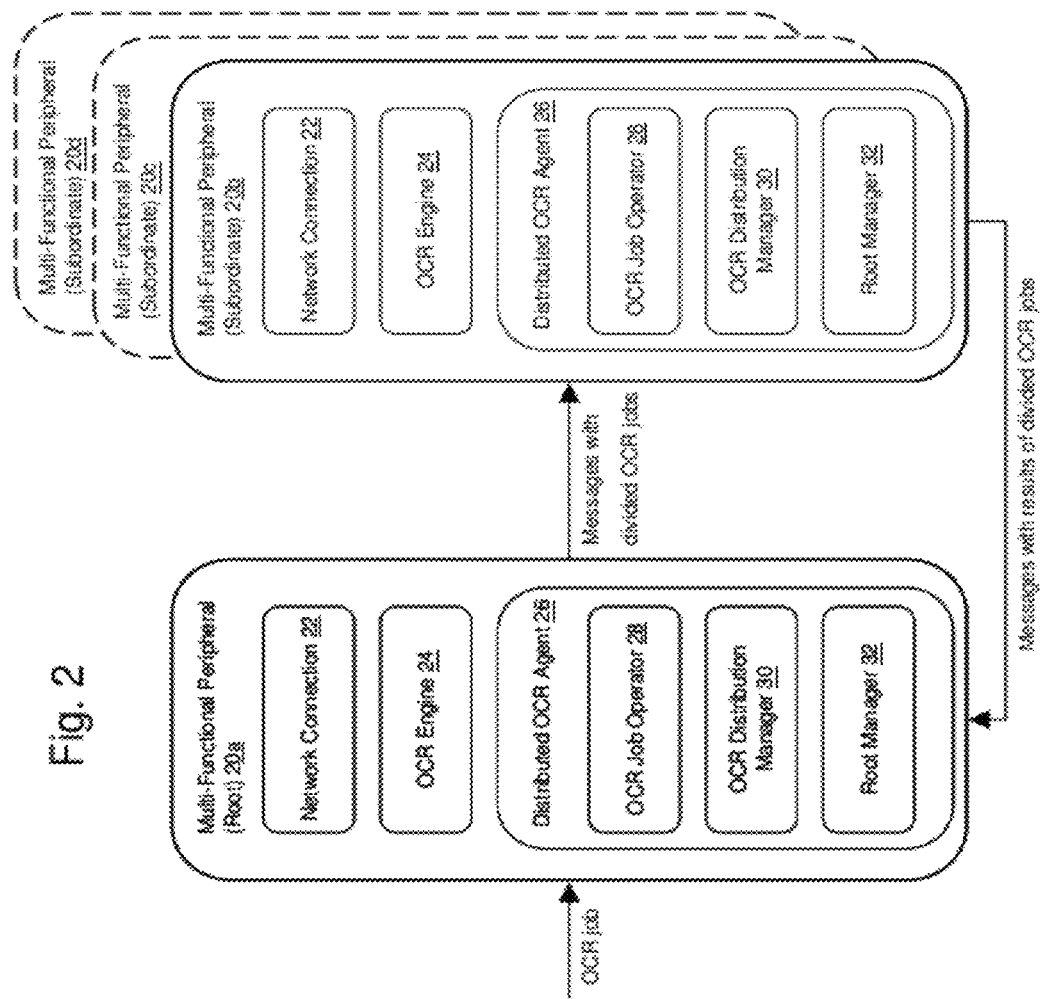
FIG. 2 illustrates main components of the MFPs in one embodiment of the distributed OCR system.

As illustrated in FIG. 2, one embodiment of the distributed OCR processing system requires communication among a plurality of MFPs (e.g., MFPs 20a-20d), each with at least all the identical components illustrated in FIG. 2 and further discussed below. Among the plurality of MFPs involved in a distributed OCR job, a single MFP takes the role of either a Root MFP or a Subordinate MFP.

An MFP (e.g., MFP 20a) from which an OCR job originates takes the role of the Root MFP. The OCR job may be generated by the Root MFP based on information inputted by a user via a user input device, such as the operation panel 174 illustrated in FIG. 5B, of the Root MFP. For example, the user may scan a document by placing the document on the platen glass of the Root MFP and issue a scan command using the operation panel 174, and selecting a OCR processing function using the operation panel, which causes the Root MFP to automatically create a distributed OCR job for the scanned document. In another embodiment, the scanning and creation of the distributed OCR job may be performed in response to the user selecting a single command (e.g., a distributed OCR processing request).

Further, in other embodiments, the user may retrieve a previously scanned document stored in the Root MFP or load a previously scanned document into the Root MFP, by identifying a location of the previously scanned document, to be processed as a distributed OCR job. For example, the user may cause the Root MFP to retrieve image data from a remote device connected to the Root MFP over the network 12 or a portable storage device that has been physically connected to the Root MFP. Alternatively, the OCR job or an OCR job creation request, including the image data or a location of the image data, may be transmitted to the Root MFP over a network (e.g., the network 12), a local wireless connection (e.g., Bluetooth), fax, or a physical connection (e.g., USB connection to a portable storage device such as a USB drive).

The image data (e.g., pages of a document) associated with the OCR job can be inputted into the Root MFP via a scanner feature of the Root MFP, read from a portable storage device (e.g., a USB drive), or received over the network, local wireless connection, or physical connection (e.g., via fax or e-mail). For example, the images may be received from one or a combination of the server 14, client devices 16a and 16b, or the other devices discussed above with respect to FIG. 1.

Further, the OCR job may be generated automatically in other embodiments based on, for example, the availability of image data or predetermined characteristics of the image data. In these embodiments, an MFP is configured to automatically OCR, or determine whether to OCR, the available image data received by the MFP. As noted above, the image data may be received by the MFP via fax or e-mail, or automatically retrieved from a physically connected portable memory device such as a USB drive.

For example, an MFP may be configured to automatically OCR any incoming fax, or any incoming fax with a predetermined characteristic (e.g., a predetermined name in a from field and/or a predetermined phrase in the subject field). In another embodiment, the MFP is configured to OCR any bar code, or one or more predetermined regions, on a title page of a scanned or faxed document, and to use the bar code, or one or more predetermined regions, to read OCR job instructions (e.g., OCR/do not OCR).

An MFP that receives a subset of the distributed OCR job originating at the Root MFP takes the role of a Subordinate MFP (e.g., MFPs 20b-20d). The number of Subordinate MFPs participating in the distributed OCR processing of the OCR job is not limited to a particular number and can be a single MFP or number in the tens, hundreds, or thousands.

It should be noted that the MFPs may or may not be dedicated to a specific role with regard to being a Root or Subordinate MFP. That is, one embodiment of the present invention allows any particular MFP to be a Root MFP during the processing of one distributed OCR job and to be a Subordinate MFP during the processing of another distributed OCR job.

FIG. 2 illustrates an embodiment of the identical components included in each of the plurality of MFPs. As illustrated in FIG. 2, each of the MFPs 20a-20d includes a network connection 22, an OCR engine 24, and a distributed OCR agent 26. The distributed OCR agent 26 includes an OCR job operator 28, an OCR distribution manager 30, and a root manager 32.

The network connection 22 includes all components that allow a network host to communicate on the network. For example the network connection 22 includes a wired or wireless network interface card. In one embodiment, the network connection 22 includes the multi-port network interface 166 illustrated in FIG. 5C.

In one embodiment, the OCR engine 24 involves all software components that work to electronically translate images into machine-readable text. For example, the OCR engine 24 may correspond to software that reads an image and creates a separate output that can be used for editing, retrieval, search, and/or storage. The images may be handwritten, printed text, or other machine-readable representations of data such as a bar code.

As noted above, each of the MFPs 20*a*-20*d* also includes a distributed OCR agent 26. The distributed OCR agent 26 is a software component that is responsible for managing the operation and distribution of subsets of OCR jobs, and includes three main components. [The main components of the distributed OCR agent 26 are an OCR job operator 28 that performs OCR on the subset of the OCR job that a respective MFP receives, an OCR distribution manager 30 that further divides the remainder of the OCR job that the respective MFP receives and sends the divided remainder to at least one other Subordinate MFP for further processing, and a root manager 32 that is responsible for launching the distributed OCR job and then stitching, or combining, together results received from the Subordinate MFPs participating in the processing of the distributed OCR job. The OCR job operation 28 performs OCR by triggering/instructing the OCR engine 24 to electronically translate the one or more images in the subset of the OCR job into machine-readable text. Further, the root manager 32 component operates on the Root MFP only, and may be excluded from a dedicated Subordinate MFP. That is, each Subordinate MFP and Root MFP uses the OCR job operator 28 and the OCR distribution manager 30, and the single Root MFP additionally uses the root manager 32.

The software components of the OCR engine 24 and the distributed OCR agent 26 may be executed by one or more processors. In an exemplary embodiment, the software components of the OCR engine 24 and the distributed OCR agent 26 may be executed on the same or different processors and are separate components. For example, the software components of the OCR engine 24 may be executed on one processor, and the three main components of the distributed OCR agent 26 may be executed on one or more different processors. Alternatively, the software components of the OCR engine 24 and the distributed OCR agent 26 may be executed on the same processor, such as the CPU 160 of FIG. 5B. Further, the OCR engine 24 and/or distributed OCR agent 26 may be partially or wholly implemented by hardware circuitry. In an alternative embodiment, the OCR Engine 24 and the distributed OCR agent 26 are provided by a single component.

Figure 3:
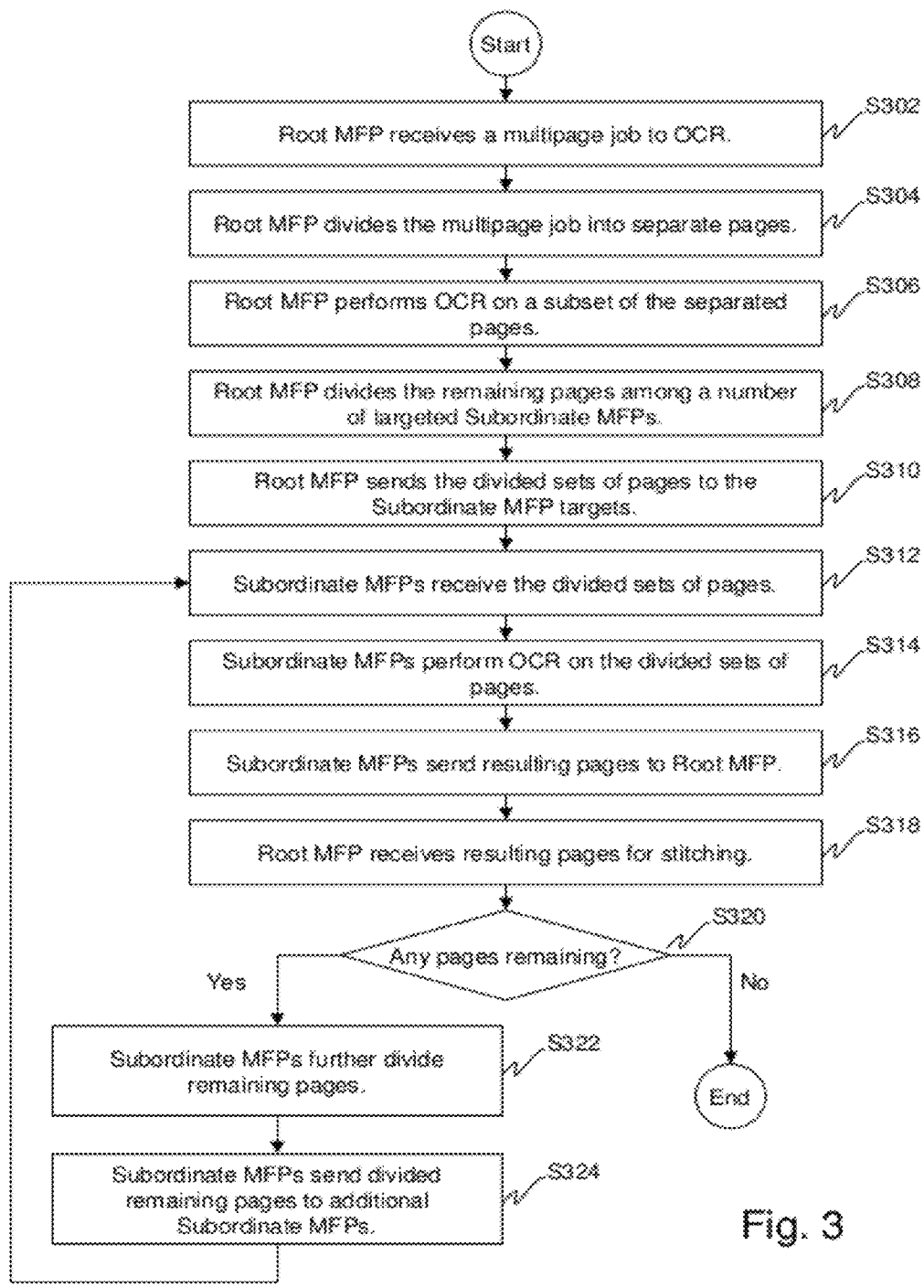
FIG. 3 illustrates general steps of processing a distributed OCR job in one embodiment of the present invention.

FIG. 3 illustrates general steps for processing a distributed OCR job in one embodiment of the present invention. In step S302, an MFP receives a multipage job to OCR and therefore is designated the Root MFP. Alternatively, the multipage job may be generated by the Root MFP. The OCR job is divided into separate pages comprising the job in step S304, and the Root MFP performs OCR on a subset of these pages in step S306. The Root MFP then subdivides the remaining pages (i.e., the unprocessed pages) among a number of targeted Subordinate MFPs in step S308 and sends these divided sets of pages to these targets in step S310.

In step S312, each of the targeted Subordinate MFPs receive a page set and perform OCR on a subset of the page set in step S314. Further, in step S316, each Subordinate MFP sends the resulting pages to the Root MFP. In step S318, the Root MFP receives the OCR pages from each Subordinate MFP, and stitches the pages together in the correct sequence to match the original set of pages before OCR. Based on a determination that there are remaining pages that require OCR processing in step S320, each Subordinate MFP further divides the remaining pages in step S322 and sends them to additional targeted Subordinate MFPs in step S324. These steps repeat until there are no pages remaining to OCR.

It is noted that the above described steps are not limited to the order illustrated in FIG. 3. For example, in other embodiments, the Root MFP or Subordinate MFPs may perform OCR on the subset of the separated pages at the same time, after dividing the remaining pages among a number of targeted Subordinate MFPs, or after sending the divided remaining pages. Further, the Root MFP may wait to perform stitching until all the resulting pages have been received from the Subordinate MFPs, rather than stitch the resulting pages as they are received.

Figure 4:
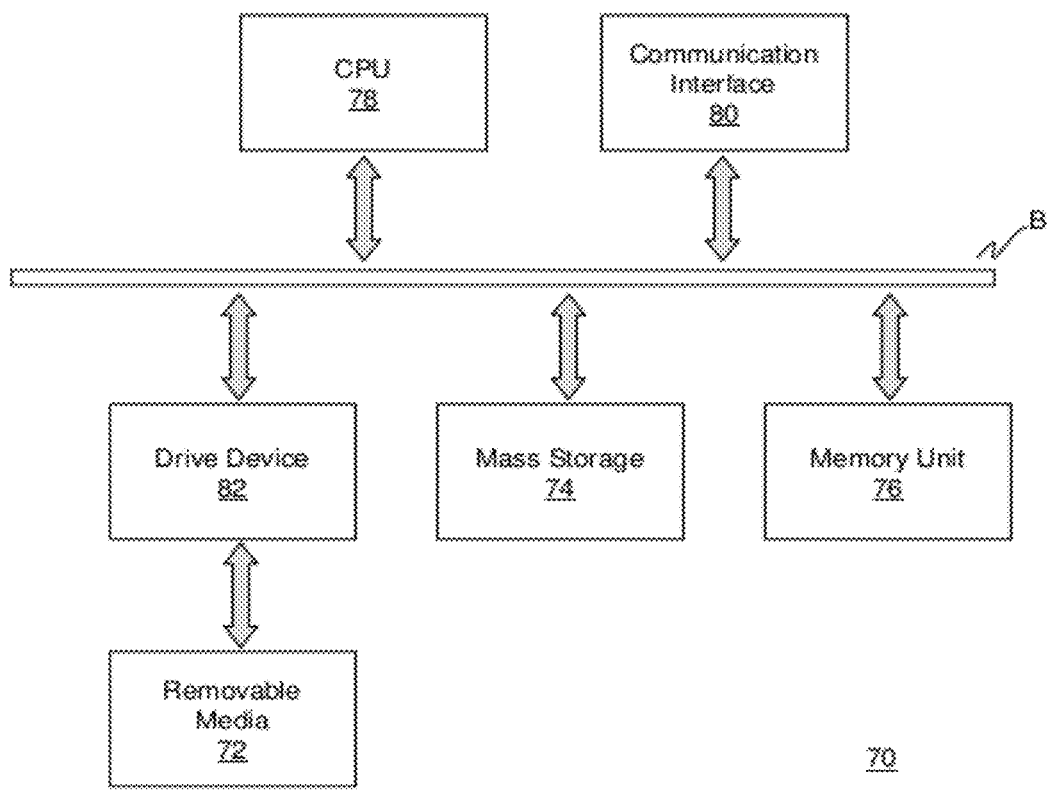
FIG. 4 illustrates hardware components of one embodiment of the client device and the server.

FIG. 4 illustrates a computer system 70 in which embodiments of the server 14, client device 16, or other device from which a plurality of images can be received by an MFP may be implemented. The server 14, client device 16, or other device may be implemented in, for example, workstations, personal computers, laptop computers, tablet computers, personal digital assistants (PDAs), cellular telephone devices, or other mobile devices. The computer system 70 includes a bus B or other communication mechanism for communicating information such as address information and data, and a CPU (or processor) 78 coupled with the bus B for processing the information. The computer system 70 also includes a memory unit (or main memory) 76, such as a random access memory (RAM) or other dynamic storage device (e.g., dynamic RAM (DRAM), static RAM (SRAM), and synchronous DRAM (SDRAM)), coupled to the bus B for storing information and instructions to be executed by the CPU 78. In addition, the memory unit 76 may be used for storing temporary variables or other intermediate information during the execution of instructions by the CPU 78. The computer system 70 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 78.

The computer system 70 may also include a disk controller coupled to the bus B to control one or more storage devices for storing information and instructions, such as mass storage 74 which may be a hard disk drive, for example, and drive device 82 (e.g., floppy disk drive, read-only optical disc drive, read/write optical disc drive, optical disc jukebox, tape drive, flash memory or a flash memory based drive, and removable magneto-optical drive). The storage devices may be added to the computer system 70 using an appropriate device interface (e.g., small computer system interface (SCSI), integrated device electronics (IDE), enhanced-IDE (E-IDE), direct memory access (DMA), or ultra-DMA).

The computer system 70 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) in order to carry out the desired functionality.

The computer system 70 may also include a display controller coupled to the bus B to control a display, such as a cathode ray tube (CRT), organic light emitting diode (OLED) display, liquid crystal display (LCD), or projector, for displaying information to a computer user. The computer system 70 may include input devices, such as a keyboard, pointing device, or touch display, for interacting with a computer user and providing information to the CPU 78. The pointing device, for example, may be a mouse, a trackball, or a pointing stick for communicating direction information and command selections to the CPU 78 and for controlling cursor movement on the display. In addition, a printer may provide printed listings of data stored and/or generated by the computer system.

The computer system 70 performs a portion or all of the processing steps in response to the CPU 78 executing one or more sequences of one or more instructions contained in a memory, such as the memory unit 76. Such instructions may be read into the memory unit 76 from another computer-readable medium, such as the mass storage 74 or a removable media 72. One or more processors in a multi-processing arrangement may also be employed to execute the sequences of instructions contained in the memory unit 76 or the removable media 72. In alternative embodiments, hard-wired circuitry may be used in place of or in combination with software instructions. Thus, embodiments are not limited to any specific combination of hardware circuitry and software.

As stated above, the computer system 70 includes at least one removable media 72, which is a computer-readable medium, or memory for holding instructions programmed according to the teachings described herein and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, optical discs (e.g., CD-ROM), or any other storage medium from which a computer can read.

Stored on any one or on a combination of computer-readable media is software for controlling the computer system 70, for driving a device or devices, and for enabling the computer system 70 to interact with a human user. Such software may include, but is not limited to, device drivers, operating systems, development tools, and applications software. Such computer-readable media further includes the computer program product for performing all or a portion (if processing is distributed) of the processing described herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer-readable medium" as used herein refers to any medium that participates in providing instructions to the CPU 78 for execution. A computer-readable medium may take many forms, including but not limited to, non-volatile media, and volatile media. Non-volatile media includes, for example, optical, magnetic disks, and magneto-optical disks, such as the mass storage 74 or the removable media 72. Volatile media includes dynamic memory, such as the memory unit 76.

Various forms of computer-readable media may be involved in carrying out one or more sequences of one or more instructions to the CPU 78 for execution. For example, the instructions may initially be carried on a magnetic disk of a remote computer. The remote computer can load the instructions remotely into a dynamic memory and send the instructions over a telephone line using a modem. A modem local to the computer system 70 may receive the data on the telephone line and use an infrared transmitter to convert the data to an infrared signal. An infrared detector coupled to the bus B can receive the data carried in the infrared signal and place the data on the bus B. The bus B carries the data to the memory unit 76, from which the CPU 78 retrieves and executes the instructions. The instructions received by the memory unit 76 may optionally be stored on mass storage 74 either before or after execution by the CPU 78.

The computer system 70 also includes a communication interface 80 coupled to the bus B. The communication interface 80 provides two-way data communication coupling to a network that is connected to, for example, a LAN, or to another communications network such as the Internet. For example, the communication interface 80 may be a network interface card to attach to any packet switched LAN. As another example, the communication interface 80 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 80 sends and receives electrical, electromagnetic, or optical signals that carry digital data streams representing various types of information. However, in other embodiments, the communication interface 80 may simply provide for one-way data communication.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, CAT 6 cable, coaxial cable, optical fiber, etc). The signals through the various networks and the signals on the network and through the communication interface 80, which carry the digital data to and from the computer system 70, may be implemented in baseband signals, or carrier wave based signals. The baseband signals convey the digital data as un-modulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as un-modulated baseband data through a "wired" communication channel and/or sent within a predetermined frequency band, different than baseband, by modulating a carrier wave. The computer system 70 can transmit and receive data, including program code, through the network and the communication interface 80. Moreover, the network may provide a connection to a mobile device such as a personal digital assistant (PDA) laptop computer, or cellular telephone.

Alternatively, the client device 16 may be implemented in a digital copier/printer multi-function machine, as further discussed below. For example, the client device 16 may capture images, which are transmitted to a Root MFP for distributed OCR processing. The transmission of the images may be initiated in response to a request at the client device 16 or the Root MFP.

Figure 5A:
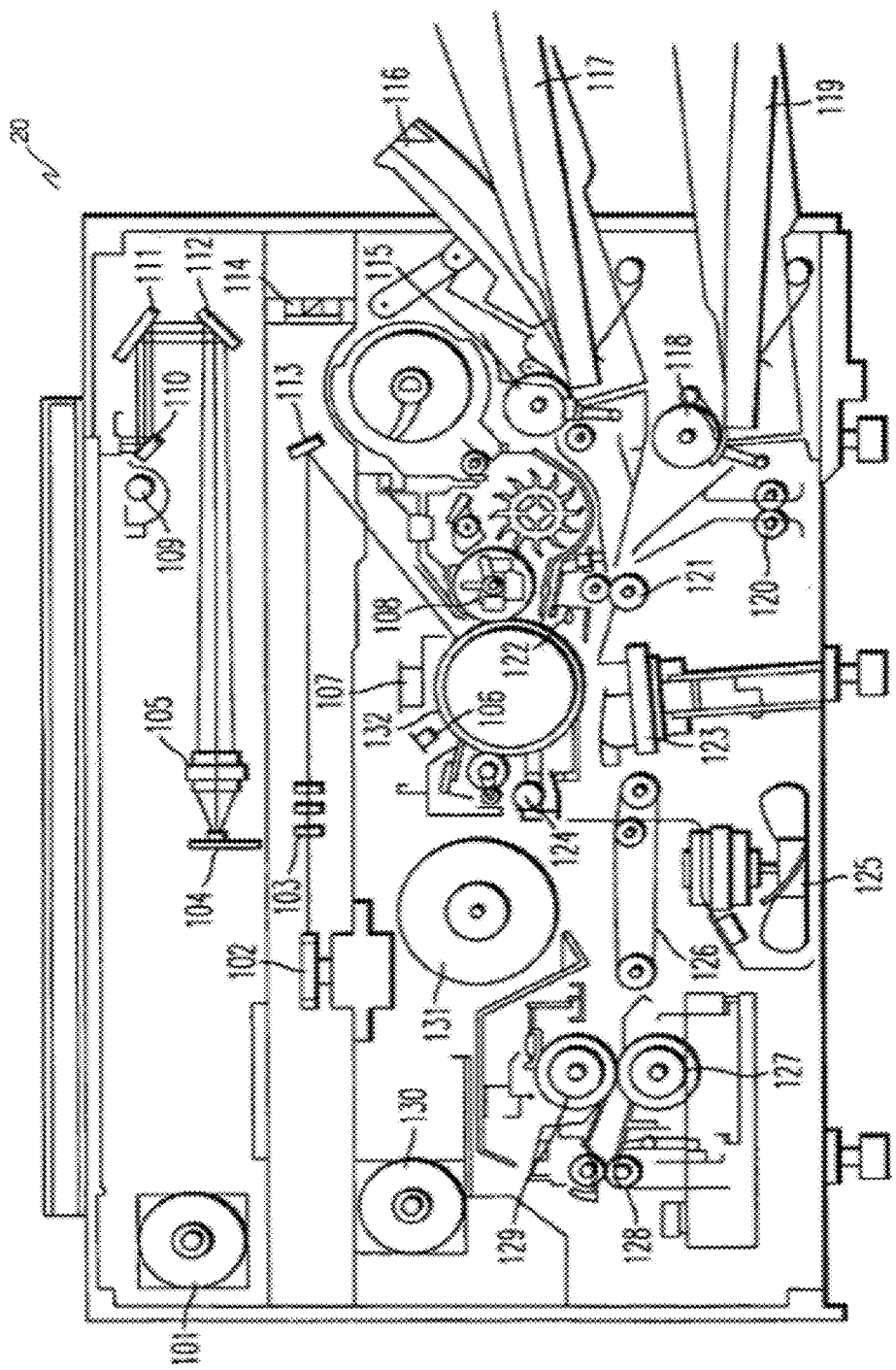
FIG. 5A illustrates hardware components of an exemplary MFP.

FIG. 5A illustrates an exemplary mechanical layout of the MFP 20 illustrated in FIG. 1, which may correspond to a digital copier/printer multi-function machine. In FIG. 5A, 101 is a fan for the scanner, 102 is a polygon mirror used with a laser printer, and 103 designates an F theta lens used to collimate light from a laser. Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the MFP 20, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the MFP 20.

Figure 5B:
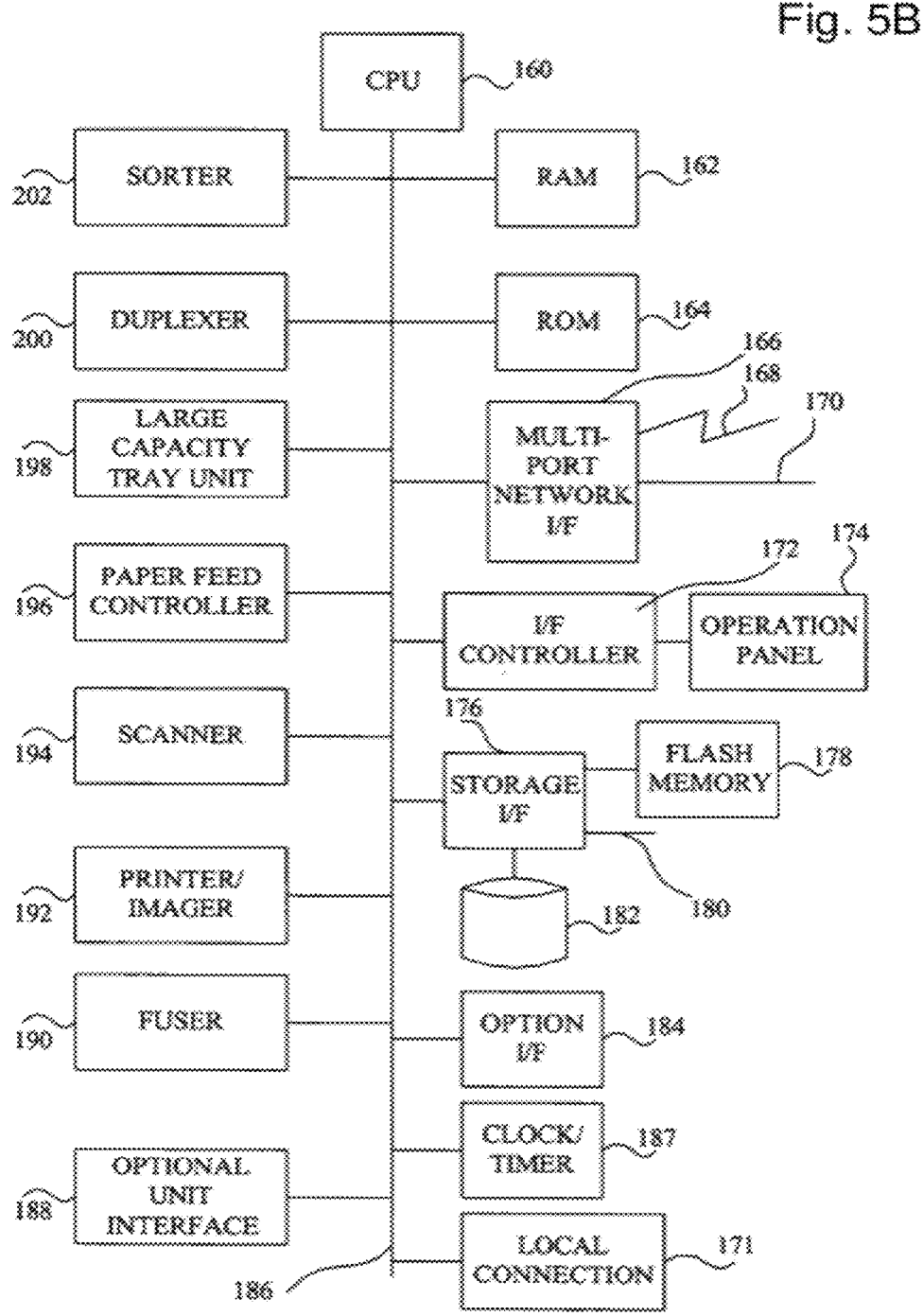
FIG. 5B illustrates electronic components of the MFP illustrated in FIG. 5A.

FIG. 5B illustrates an exemplary block diagram of the electronic components of the MFP 20 illustrated in FIG. 5A. The CPU 160 is a microprocessor and acts as the system controller. There is a random access memory (RAM) 162 to store dynamically changing information including operating parameters of the digital copiers. A read-only memory (ROM) 164 stores the program code used to run the MFP 20 and also information describing the static-state data such as model number, serial number, and default parameters that would not change over the life of the machine. When the device needs to boot up from either a hard disk or flash memory, the ROM memory 164 stores the boot sequence.

Similar to the computer system 70 discussed above, the MFP 20 may perform a portion of or all processing steps in response to the CPU 160 executing one or more sequences of one or more instructions contained in a memory, such as the ROM 164 or of one of the memory types discussed above with respect to the computer system 70. The instructions may be read into the memory from another computer-readable medium, as discussed above, such as mass storage or removable media. One or more processors in a multi-processing arrangement may also be employed to execute the sequences of instructions contained in the memory. In alternative embodiments, hard-wired circuitry may be used in place of or in combination with software instructions. Thus, embodiments are not limited to any specific combination of hardware circuitry and software.

There is provided a multi-port communication interface 166, which allows the MFP 20 to communicate with external devices. Reference numeral 168 represents a telephone or other communication line including a wireless channel. Reference number 170 represents a wired communication line, such as a wired telephone or Ethernet connection. Further information of the multi-port communication interface is described with respect to FIG. 5C. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display, or other displays as discussed above, may be included within the operation panel 174 to display parameters and messages of the apparatus. The operation panel also can be a touch panel in which the display and function buttons may change according to the context.

A local connection interface 171 is a connection through a local port such as RS232, USB and IEEE 1394. This interface 171 allows external devices to be attached to the apparatus.

A storage interface 176 connects storage devices to the system bus 186. The storage devices include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 5B, the various sections making up the MFP 20 are illustrated. Reference numeral 202 designates a sorter and contains sensors and actuators used to sort the output of the MFP 20. There is a duplexer 200 that allows a duplex operation to be performed and includes conventional sensors and actuators. The MFP 20 includes a large capacity tray unit 198 that allows paper trays holding a large number of sheets to be used. The large capacity tray unit 198 includes conventional sensors and actuators.

A paper feed controller 196 is used to control the operation of feeding paper into and through the MFP 20. A scanner 194 is used to scan images into the MFP 20 and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the MFP 20 and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the MFP 20.

Figure 5C:
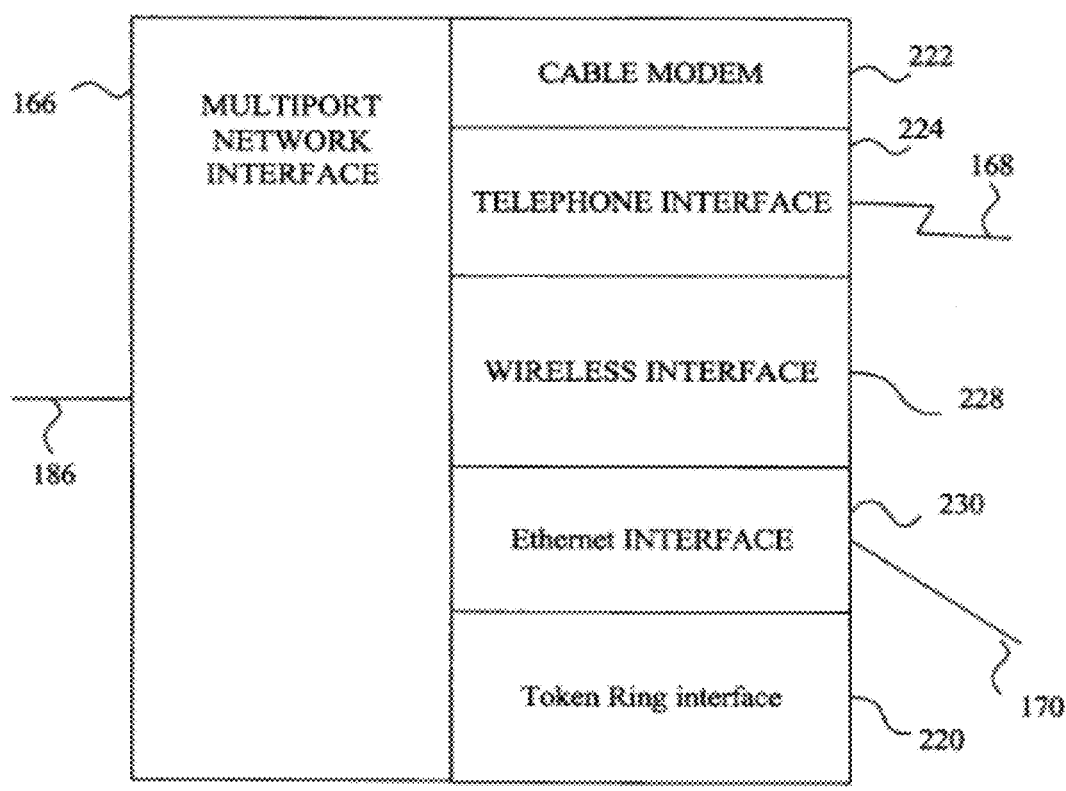
FIG. 5C illustrates details of the multi-port communication interface illustrated in FIG. 5B.

FIG. 5C illustrates details of the multi-port network interface 166. The MFP 20 may communicate to external devices through a Token Ring interface 220, a cable modem unit 222 that has a high speed connection over cable, a conventional telephone interface 224 that connects to a telephone line 168, a wireless interface 228, and an Ethernet interface 230. Other interfaces (not shown) include, but are not limited to, a Digital Subscriber line. The multi-port network interface does not need to have all the interfaces described in FIG. 5C.

The CPU or other microprocessor or circuitry executes a monitoring process to monitor the state of each of the sensors of the MFP 20, and a sequencing process is used to execute the instructions of the code used to control and operate the MFP 20. Additionally, there is (1) a central system control process executed to control the overall operation of the MFP 20 and (2) a communication process used to assure reliable communication to external devices connected to the MFP 20. The system control process monitors and controls data storage in a static state (e.g., the ROM 164 of FIG. 5B), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine, but this embodiment is equally applicable to other business office machines or devices such as an analog copier, a facsimile machine, a printer, a facsimile server, or other business office machines and business office appliances that are configured to perform OCR processing on image data. Alternatively, the distributed OCR processing performed by the MFP 20 may be performed in an OCR server implemented, for example, by the computer system 70 illustrated in FIG. 4. For example, in one embodiment, one or more of the MFPs participating in the processing of a distributed OCR job may be replaced with one or more OCR servers.

Figure 6A:
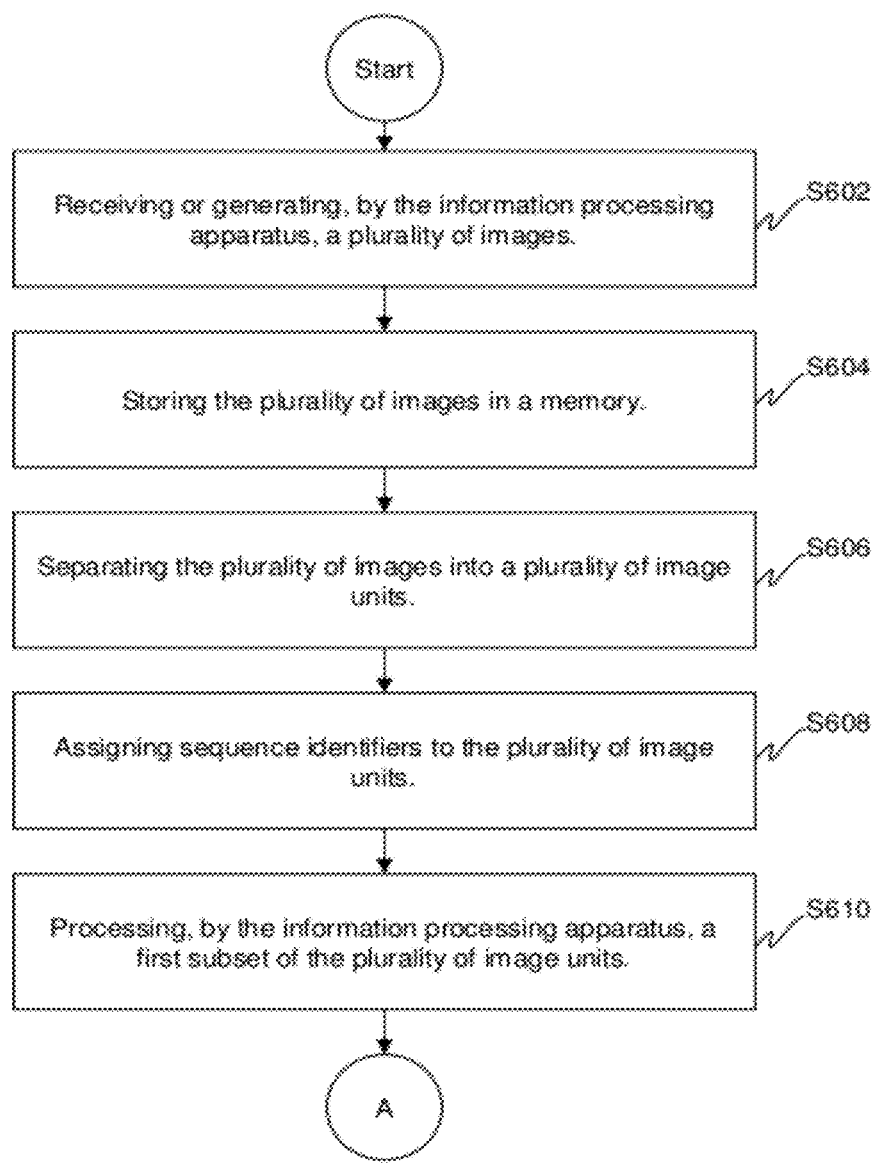
FIGS. 6A and 6B illustrate a flow diagram of a distributed OCR process performed at a Root MFP according to one embodiment.
Figure 6B:
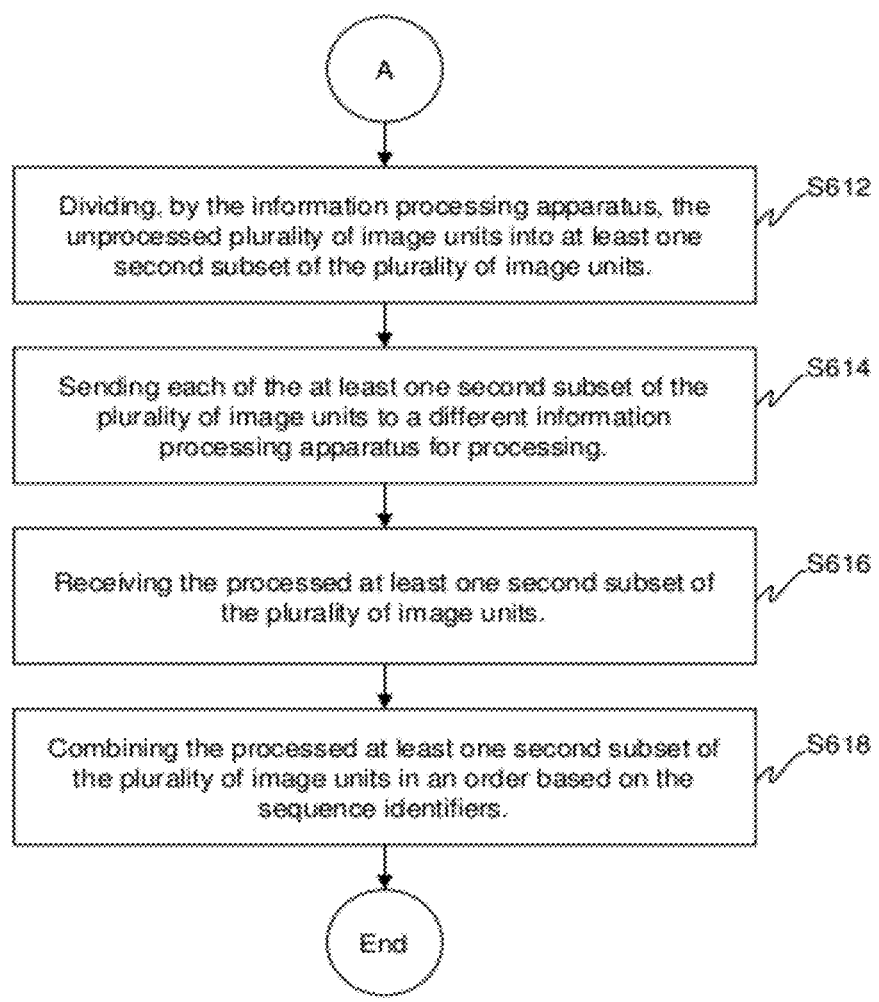

FIG. 6A illustrates an exemplary process performed by a Root MFP for a distributed OCR job. In step S602, the Root MFP receives or generates image data corresponding to a plurality of images. As discussed above, the plurality of images may include one or a combination of hand-written or printed text, or other machine-readable representation of data such as a barcode. The received/generated plurality of images are stored in a first memory in step S604. After the storage of the received/generated plurality of images, the plurality of images are separated into a plurality of image units in step S606. The plurality of images are typically equally divided into the plurality of image units, such as pages of a scanned document, according to page breaks or other division criteria. The other division criteria may include, for example, division according to one or a combination of document chapters, sections, arbitrary size (e.g., number of words), etc. In step S608, sequence identifiers, such as serial numbers, to identify the original sequence of images are assigned to the plurality of image units. A first subset of the plurality of image units is selected and processed by the Root MFP in step S610. The remaining, unprocessed, plurality of image units are divided into at least one second subset of the plurality of image units in step S612. In step S614, each of the at least one second subset of the plurality of image units is sent to a different information processing apparatus, such as any one of MFPs 20b-20d, for processing. The processed at least one second subset of the plurality of image units is received by the Root MFP in step S616, and combined, or otherwise stored, in an order based on the sequence identifiers in step S618.

Figure 7:
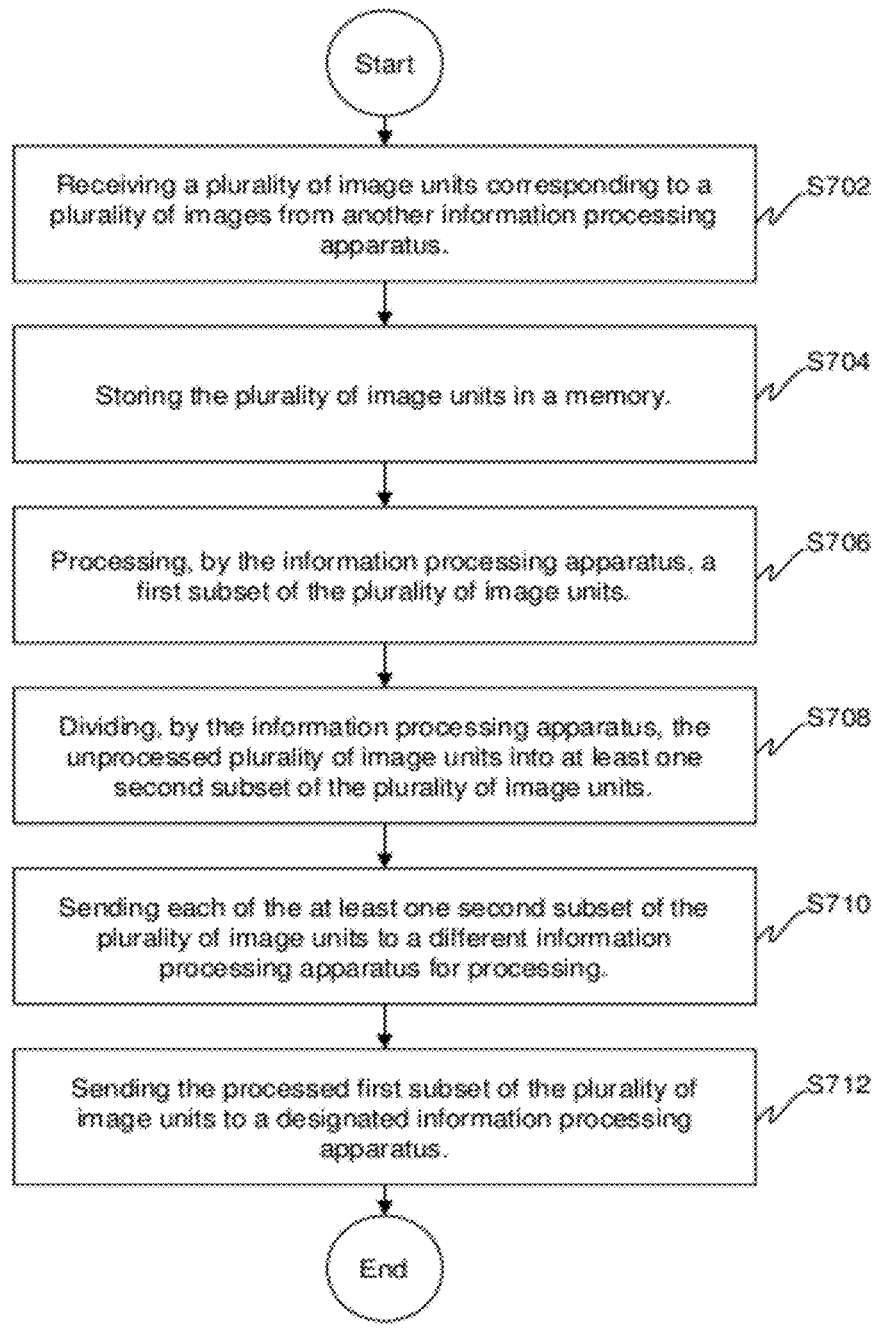
FIG. 7 illustrates a flow diagram of one embodiment of a distributed OCR process performed at one or more subordinate MFPs.

FIG. 7 illustrates an exemplary process performed by a Subordinate MFP for a distributed OCR job. In step S702, a plurality of image units corresponding to a plurality of images is received from another information processing apparatus, such as any one of MFPs 20a-20d. The plurality of images corresponds to a subset of the total images in the distributed OCR job. The plurality of image units are stored in a memory in step S704. In step S706, a first subset of the plurality of image units is selected and processed. The unprocessed plurality of image units are divided into at least one second subset of the plurality of image units in step S708 and each of the at least one second subset of the plurality of image units is sent to a different information processing apparatus for processing in step S710. The processed first subset of the plurality of image units are then sent to a designated information processing apparatus, such as the Root MFP 20a in step S712.

As noted above, a Root MFP receives a multipage job to OCR. In one embodiment, the root manager 32 launches the distributed OCR job as follows. It designates the MFP 20a as a Root MFP and splits the multiple pages into S separate pages and assigns a serial number to each in order to associate it to the page sequence in the original multipage set. The root manager 32 then assembles an OCR Job Message, such as the OCR Job Message 900 illustrated in FIG. 9 and further discussed below, using these pages and sequence numbers to create the OCR job to divide. In one embodiment, the OCR Job Message contains special instructions for the OCR Engine 24 and/or the OCR Job Operator 30. The instructions and MFP distribution list in this message are obtained either from memory, or from a centralized server, or a dedicated MFP, or other source.

The OCR job operator 28 on the Root MFP 20a performs OCR on a subset N number of the pages (N is taken from the instructions in the OCR Job Message) of the original S pages and stores the results in memory, as a file, or other form of data persistence.

The OCR distribution manager 30 on the Root MFP 20a then subdivides the remaining pages and sends to Subordinate MFPs, such as MFPs 20b-20d illustrated in FIG. 2, as follows. The OCR distribution manager 30 iterates down the MFP distribution list of D MFPs, included in the OCR Job Message, and sends test messages to each MFP in the list to find T MFPs, for example the first T MFPs, which is defined in the instructions of the OCR Job Message, on the MFP distribution list that are available to participate as a Subordinate MFP. Alternatively, test messages may be sent to a subset of the MFPs listed in the MFP distribution list. Qualifications to participate include: MFP currently is powered up and MFP is operationally capable of responding to OCR Job Message, as described below.

The S-N remaining pages for OCR are then divided equally among the T MFPs, or as equally as possible if the remaining pages cannot be evenly divided. The D-T MFPs on the distribution list likewise are divided equally among the T MFPs. An OCR Job Message is constructed for each T Subordinate MFP by composing a divided page set and distribution list in each. The OCR Job Message to each T is completed by copying the instructions to them. The OCR Job Message is sent to each T Subordinate MFP.

Each T Subordinate MFP processes this message similarly to the Root MFP 20a. The OCR job operator 28 on each performs OCR on a subset N of the pages received and, in this case, sends the results to the Root MFP 20a in an OCR Job Result Message, such as the OCR Job Result Message 1000 of FIG. 10 further discussed below. In one embodiment, the address of the Root MFP is found in the instructions included in the OCR Job Message. The OCR distribution manager 30 in each T Subordinate MFP divides pages and distribution lists identically as done by the Root MFP 20a, and sends resulting OCR Job Messages to T new Subordinate MFPs.

Note that OCR processing of N pages is occurring in parallel among T MFPs at this point. This process repeats at the new level of Subordinate MFPs. Note that at this level OCR processing of N pages is occurring in parallel among T to the power of 2 MFPs. This process repeats until MFPs receive pages in the OCR Job Message that are equal to or less than N. When this occurs, the MFP performs OCR on these pages resulting in no pages remaining to divide into new OCR Job Messages.

As OCR Job Messages propagate to MFPs on the MFP distribution list, the results of these jobs arrive at the Root MFP 20a in OCR Result Messages. The root manager 32 on the Root MFP 20a takes these messages and stitches page sets together to form a completed OCR job with processed pages that correspond in sequence to the original multipage set that launched the distributed OCR job. In one embodiment, the stitching is done by annealing the last sequence number of one set to a set whose first sequence number is one increment higher. Alternatively, stitching may performed using any other information that identifies the position of a page set within the original multipage set.

It is possible for any point in the process described above that an MFP fails to complete OCR on the subset N of the pages sent to it. This would result in the Root MFP's inability to stitch together a complete set of pages that correspond with the original multipage set. There are many ways that such failures can be handled. The most straightforward method is for the Root MFP 20*a* to set a timer at the launch of the distributed OCR job and stop it when the job completes (all pages stitched). If the timer expires before the job completes (results of all pages have not been received) the Root MFP 20*a* resets the timer and starts the process from the beginning using only the missing pages and completes the original job when the results of the missing pages arrive. Values of N, S, and T may be used to adjust the expiration setting for this timer.

It is also possible that MFPs have pages to subdivide but no MFPs on the distribution list to subdivide, i.e. no Subordinate MFPs as targets for OCR Job Messages. There are numerous ways to handle this condition. One is to use the timer method as described above. The page sets sitting on MFPs with no targets to distribute to act as missing pages in this case. After the timer on the Root MFP 20*a* expires, these missing pages would be sent by the Root MFP 20*a* for distributed processing as described in the paragraph above. More elaborate ways to deal with this "more pages but not targets" condition are possible. For example, the value of N (subset of pages in single OCR jobs) can be mathematically computed from S (total number of original pages to OCR) and D (total number of MFPs on Root MFP's MFP distribution list) so that the "more pages no targets" condition does not occur. Mathematically, N=S/D where N is a whole number rounded up from a decimal value.

Figure 8:
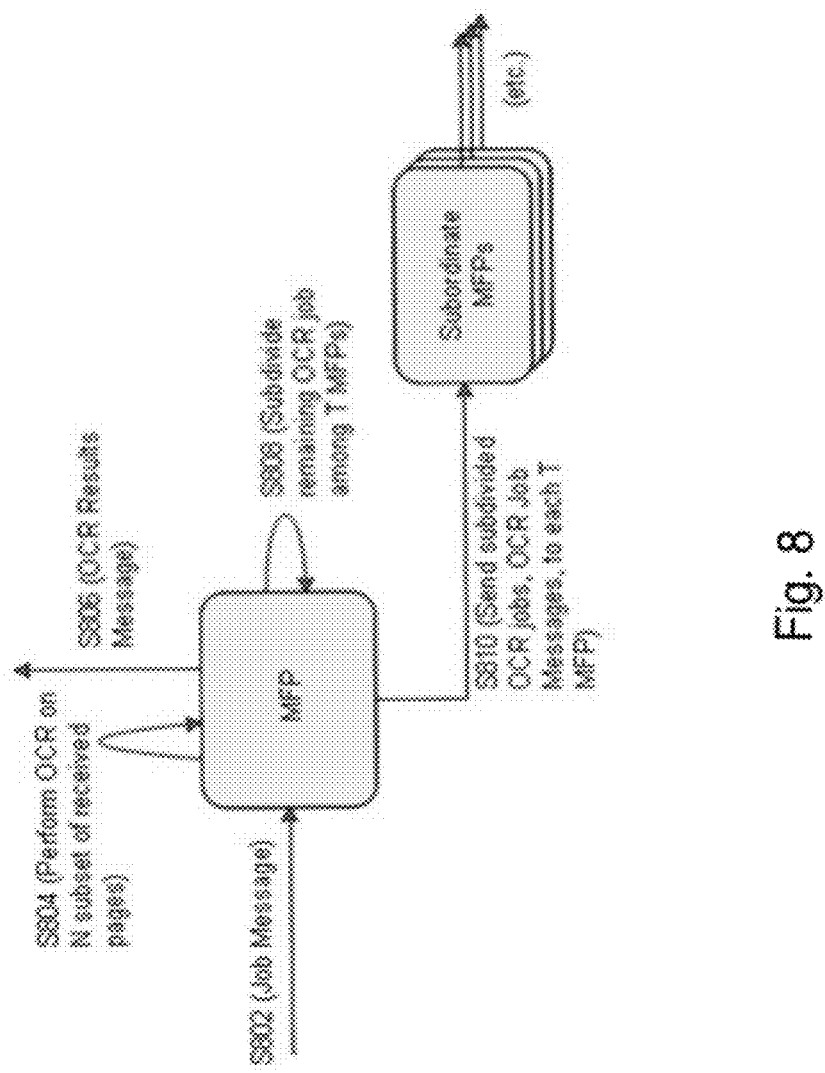
FIG. 8 illustrates a flow diagram of a divide and distribute process performed by one or more MFPs for a distributed OCR job.

The details described above can be reduced to a single divide and distribute mechanism repeated among MFPs as shown in FIG. 8. In step S802 an MFP receives an OCR job message. The MFP performs OCR on a subset of N received pages in step S804 and transmits an OCR results message in step S806. In step S808, the remaining pages of the OCR job received by the MFP is subdivided among T MFPs and sent to each T MFP in step S810.

Iteration of this divide and distribute method among MFPs on the distribution list produces a hierarchical, parallel processing, peer-to-peer network with important advantages in time required to OCR a multipage job as described below.

The hierarchical network is created when the Root MFP 20*a* distributes subsets of the job to each of T Subordinate MFPs, when each of these distribute to T and so on. This creates a tree like structure where one MFP exists as the Root MFP, T MFPs exist at level 1, T squared MFPs exist at level 2, T cubed MFPs exist at level 3 and so on. Because all OCR jobs at each level are parallel and thus performed concurrently, the time it takes to complete all jobs at one level is the time it takes to complete one OCR job.

Suppose, for example, a 120 page document has each page taking 1 second to OCR. For this job to complete on one MFP, the 120 pages would be processed in sequence and take 2 minutes to complete. Now suppose these S=120 pages are processed by the distributed OCR processing of the present invention. To do so, suppose the following parameter values in the OCR Job Message instructions: T=5 MFPs. Suppose also that it takes 2 seconds total for one MFP to concurrently send its subdivided job to the T=5 MFPs. Since, in one embodiment, the Root MFP 20*a* stitches as results arrive, the time to stitch the completed job will approximately equal the time it takes for the last MFP to complete and send its OCR job. If there are D=20 MFPs available then N=S/D=6 pages are in a set for each divided OCR job.

The results are as follows. One page will be completed at level 1 (the Root MFP 20*a*) in 6 seconds. It will take 2 seconds to send the subdivided job to the 5 MFPs at the next level, and 6 seconds to complete 30 pages in parallel at this level. It will take 2 seconds for the next subdivisions of job to be sent in parallel to the 14 remaining MFPs at the next level, where it will take 6 seconds to process, in parallel, the remaining 84 pages. The total time to complete the job with one embodiment of this invention is approximately 22 seconds or less than 20% the time to complete on a single MFP. These calculations are not exact and will vary with differences in network environments, number of pages in a divided OCR job (i.e. N), and other factors. Nevertheless, the calculations show significant time gains produced by the present invention.

In general, these large time savings are due to the parallel processing of divided OCR jobs among MFPs. Parallelism exists among all MFPs on a single tree level created by the divide and distribute method of this invention; this parallelism becomes quite large because of the exponential growth of MFPs on a single level as the job propagates from one level to the next. This parallelism increases with increasing D (number of MFPs to share the processing) and T (number for each MFP to send subdivided OCR jobs).

Figure 9:
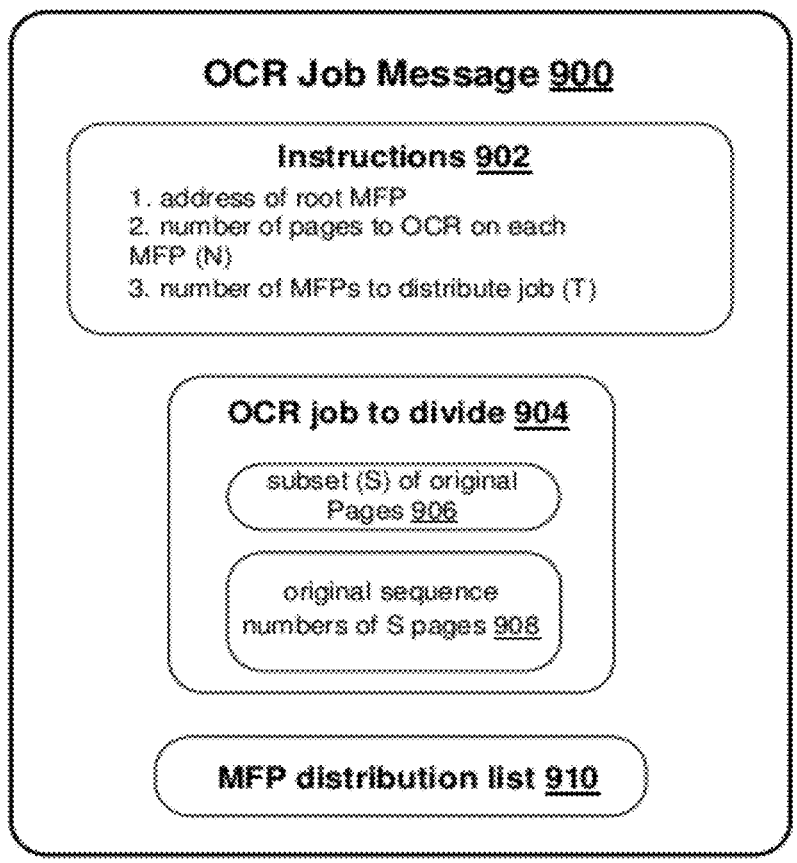
FIG. 9 illustrates an embodiment of an OCR Job Message.

FIG. 9 illustrates an embodiment of an OCR Job Message, which is transmitted from one MFP to another MFP. The OCR Job message 900 includes instructions 902 that are machine-readable instructions with three components that provide the following information for each MFP 20 involved in a distributed OCR job. In one embodiment, the instructions 902 are identical for each MFP and include the address of the Root MFP, the number of pages to OCR on each MFP (N), and the number of MFPs to which the job is distributed (T).

The address of the Root MFP identifies the address of the Root MFP used as a destination to send a result of the divided OCR job. The address of the Root MFP may identify the MFP from which the distributed OCR job originates, a default device, or another device designated by the user. The number of pages to OCR on each MFP defines the number of pages N the Subordinate MFP that receives the OCR Job Message will OCR. Further, the number of MFPs to distribute job defines the number of MFPs to send the remaining pages of the OCR job that require further division and performance of OCR.

As illustrated in FIG. 9, the OCR Job Message 900 further includes an OCR job to divide 904 and an MFP distribution list 910. The OCR job to divide 904 holds a subset of pages from the original OCR job 906 and the sequence numbers of the pages in relation to all pages in the original OCR job 908. The MFP distribution list 910 is a machine readable list of host addresses of MFPs that can participate in the same distributed OCR job. MFPs that are peers on the same network and that possess each component illustrated in FIG. 2 are eligible for membership on this list.

Figure 10:
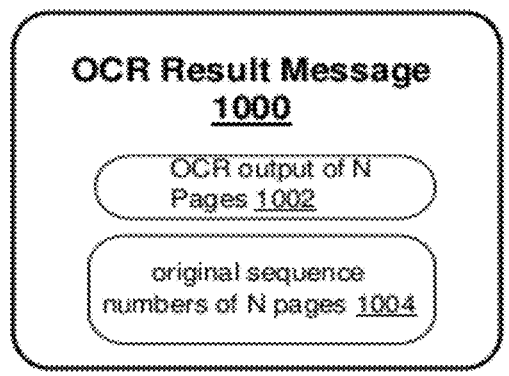
FIG. 10 illustrates an exemplary OCR Result Message that is sent from a Subordinate MFP to a Root MFP.

FIG. 10 illustrates an embodiment of an OCR Result Message, which is sent to the device designated by the OCR Job Message (e.g., Root MFP) by Subordinate MFPs that participate in a distributed OCR job by performing OCR on a subset of the original OCR job. As illustrated in FIG. 10, the OCR Result Message 1000 holds the result of a divided OCR job, i.e., machine-readable text of N pages 1002 and sequence numbers of these N pages 1004, which are in relation to the full sequence of pages in the original job.

By way of summary, the distributed OCR processing system in one embodiment of the present invention includes the following features:

1. A single MFP receives an original multipage OCR job and then divides and distributes subsets to a plurality of MFPs.

2. The plurality of MFPs in (1) may each further divide a received subset into smaller subsets and distribute the smaller subsets to a further plurality of MFPs.

3. The process in (2) may be repeated multiple times among further pluralities of MFPs.

4. All MFPs in (1) and (2) additionally are
   (a) able to communicate to each other on a network;
   (b) host an identical software agent;
   (c) perform OCR on a divided subset of original pages described in (1) by processing an OCR Job Message; and
   (d) process the results of an OCR job in (c) into an OCR Job Result Message that gets stored in memory of the MFP described in (1).

5. The single MFP in (1) stitches together the OCR-processed pages in (4.d) into the correct sequence to match the sequence of pages in the original multipage OCR Job in (1) thus resulting in a completion of the multipage OCR job.

6. The OCR Job Message in (4.c) has the following components:
   (a) list of network address of MFPs that satisfy all components in (4);
   (b) machine-readable instructions, composed of
      (i) network address of MFP in (1),
      (ii) integer representing number of pages each MFP will OCR-process as described in (4.c),
      (iii) integer representing number of MFPs to which each of MFP in (1) and (2) will distribute subsets of pages,
      (iv) whereby (ii) is mathematically derived as the number of pages in the original multipage OCR job in (1) divided by the integer of MFPs listed in (a);
   (c) subset of pages from original multipage OCR job in (1) that needs OCR processing, represented by (i) pages in subset, and (ii) sequence number of each page in subset (i) in relation to the sequence in the original multipage OCR job in (1).

7. OCR Job Result Message in (4.d) has the following components:
   (a) OCR-processed pages in (6.c) that result from OCR processing described in (4.c), and
   (b) sequence number of pages in (6.c.ii).

8. Software agent in (4.b) has the following components:
   (a) OCR job operator responsible for (i) performing OCR processing on a subset of pages described in (4.c), and (ii) processing results of OCR job as described in (4.d);
   (b) OCR distribution manager responsible for dividing and distributing subsets of pages as described in (1) and (2);
   (c) root manager responsible for (i) dividing original multipage document into separate single pages by MFP in (1), (ii) assigning sequence number to single pages to represent their sequence relative to the original multipage OCR job by MFP in (1), (iii) retrieving instructions described in (6.b) by MFP in (1), (iv) retrieving list of network addresses described in (6.a) by MFP in (1), and (v) identifying MFP as single MFP in (1) by recognizing receipt of original multipage MFP job as in (1); and
   (d) performing the stitching process as described in (5).

9. Identification of MFP in (8.c.v) as single MFP in (1) causes processing of results of OCR job described in (4.d) to be done by storing OCR Job Message in memory.

10. Lack of identification of MFP in (8.c.v) as single MFP in (1) causes processing of OCR job described in (4.d) to be done by sending OCR Job Message to MFP in (1) using network address in instructions described in (6.b.i).

11. An exemplary algorithm for processing OCR on a subset of pages described in (4.c) is as follows:
    (a) MFP reads integer in (6.b.ii) and extracts the first N pages from (6.c.i) where N either equals this integer value or the number of pages in (6.c.i) based on whether the integer is greater than this number of pages;
    (b) pages extracted in (a) undergo OCR-processing by MFP in (a);
    (c) MFP in (a) creates instance of OCR Job Result Message (7) using pages and their corresponding sequence numbers from (b); and
    (d) MFP in (a) sends message in (c) to network address in (6.b.i).

12. An exemplary algorithm for dividing and distributing subsets of pages as described in (1) and (2) is performed by MFP in (11) as follows:
    (a) algorithm operates if the value of N in (11.a) is less than the number of pages from (6.c.i) which represents the case where the number of pages in (11.b) is a subset of pages from (6.c.i), leaving additional pages that require OCR processing;
    (b) reads integer value in (6.b.iii);
    (c) reads list of network addresses in (6.a) and stores in memory network addresses of first T MFPs on list that respond to test message to determine if MFP is operating, where T is the value in (b);
    (d) creates new list derived from list in (6.a) with MFPs in (c) removed;
    (e) divides remaining pages and their sequence numbers in (a) to create T equal (or near equal) sized subsets of pages to OCR; and
    (f) subdivides list in (d) to create T equal (or near equal) sized sublists of network addresses of MFPs.

13. Creation of new instances of OCR Job Messages by MFP in (11) as follows:
    (a) instructions in (6.b) are copied T times where T is integer value in (6.b.iii);
    (b) one copy of instructions in (a) is combined with one subset of pages in (12.e) and one sublist from (12.f); and
    (c) step (b) is repeated for each copy of instructions in (a), subset of pages in (12.e) and sublist in (12.f) to create T OCR Job Messages.

14. The MFP in (11) sends one OCR Job Message from (13) to each of T MFPs identified in (12.c)

5. Each T MFP in (14) to which OCR Job Messages are sent performs the algorithm in (11) and then (12).

16. OCR processing in (11) and the distribution of OCR Job Message(s) as described in (12) and (13) occurs first on the MFP in (1) immediately after the root manager component on this MFP performs the processing as described by (8.c).

17. The iteration of (14) and (15) repeats until the additional pages condition in (12.a) is not satisfied.

18. The operation of (16) and (17) results in a hierarchical tree structure of MFPs in a computer cluster where the number of MFPs at each level is T (6.b.iii) times more than that on the previous level.

19. The OCR processing of equal-sized subsets of pages as described in (11) occurs in parallel (concurrently) among all MFPs on the same hierarchical tree level described in (18).

Numerous modifications and variations of the present invention are possible in light of the above teachings. It is therefore to be understood that within the scope of the appended claims, the invention may be practiced otherwise than as specifically described herein.

For example, the plurality of MFPs that perform OCR processing in parallel may be dedicated servers and not MFPs. Alternatively, a combination of MFPs and servers may be used to perform the OCR processing.

The present invention described above involves the following sequence of two steps on each MFP: perform OCR on N pages, then subdivide and send to T MFPs. The sequence of these steps may be reversed, or both steps may be performed asynchronously (i.e., concurrently), or may be reversed (i.e., subdivide and send to T MFPs, then perform OCR on N pages) with no effect on the fundamental nature of this invention.

Further, conditions can be set in the Root MFP to only distribute multipage OCR jobs that exceed a certain number of pages, that occur at a certain time of data, etc.

Moreover, the subdividing of a job for parallel processing among MFPs per the present invention may be performed on other types of jobs other than multipage OCR. Any multi-step or multi-part job (e.g., mathematical calculations, image analyses, text-to-speech, text language translation, video analysis, etc) that can be broken into independent subsets can be distributed for parallel processing among MFPs followed by recombination of results by one MFP or other designated device. As such, the computing power of a company's fleet of MFPs may be harnessed at night, for example, to perform complex, resource-intensive, or high-volume processing of work.

The invention claimed is:

1. A method of using an information processing apparatus for processing a plurality of images, the method comprising:
    receiving or generating by the information processing apparatus the plurality of images;
    storing the plurality of images in a memory;
    separating the plurality of images into a plurality of image units;
    assigning sequence identifiers to the plurality of image units;
    processing, by the information processing apparatus, a first subset of the plurality of image units;
    dividing, by the information processing apparatus, the unprocessed plurality of image units into at least one second subset of the plurality of image units; and
    sending each of the at least one second subset of the plurality of image units to a different information processing apparatus for processing.

2. The method according to claim 1, further comprising:
    receiving the processed at least one second subset of the plurality of image units; and
    combining the processed first and second subsets of the plurality of image units in an order based on the sequence identifiers.

3. The method according to claim 1, wherein
    the separating step comprises separating the plurality of images into a plurality of image units corresponding to pages of a scanned document; and
    the processing comprises performing, by the information processing apparatus, optical character recognition on the first subset of the plurality of image units.

4. The method according to claim 1, wherein the sending step comprises sending a job request message to each different information processing apparatus, the job request message including information defining a number of image units to be processed by the respective different information processing apparatus and a number of additional information processing apparatuses to which unprocessed image units are to be sent.

5. The method according to claim 2, wherein the receiving the processed at least one second subset of the plurality of image units step comprises receiving a job result message, the job result message including at least one processed image unit and a corresponding sequence identifier.

6. The method according to claim 1, wherein the dividing step comprises determining whether the number of the plurality of image units is greater than the number of the first subset of the plurality of image units and, based on a determination that the number of the plurality of image units is greater than the number of the first subset of the plurality of image units, dividing the unprocessed plurality of image units into the at least second subset of the plurality of image units according to a predetermined number of additional information processing apparatuses to which the unprocessed plurality of image units are to be sent.

7. The method according to claim 2, wherein the receiving the processed at least one second subset of the plurality of image units step comprises receiving, from another information processing apparatus, a subset of one of the at least one second subset of the plurality of image units sent to the different information processing apparatus.

8. A method of using an information processing apparatus for processing a plurality of images, the method comprising:
    receiving a plurality of image units corresponding to the plurality of images from another information processing apparatus;
    storing the plurality of image units in a memory;
    processing, by the information processing apparatus, a first subset of the plurality of image units; and
    dividing, by the information processing apparatus, the unprocessed plurality of image units into at least one second subset of the plurality of image units;
    sending each of the at least one second subset of the plurality of image units to a different information processing apparatus for processing; and
    sending the processed first subset of the plurality of image units to a designated information processing apparatus.

9. The method according to claim 8, wherein
    the receiving step comprises receiving the plurality of image units corresponding to pages of a scanned document; and
    the processing step comprises performing, by the information processing apparatus, optical character recognition on the first subset of the plurality of image units.

10. The method according to claim 8, wherein the sending each of the at least one second subset of the plurality of image units step comprises sending a job request message to each different information processing apparatus, the job request message including information defining a number of image units to be processed by the respective different information processing apparatus and a number of additional information processing apparatuses to which unprocessed image units are to be sent.

11. The method according to claim 8, wherein the sending the processed first subset of the plurality of image units includes sending a job result message, the job result message including at least one processed image unit and a corresponding sequence identifier.

12. The method according to claim 8, wherein the dividing step comprises determining whether the number of the plurality of image units is greater than the number of the first subset of the plurality of image units and, based on a determination that the number of the plurality of image units is greater than the number of the first subset of the plurality of image units, dividing the unprocessed plurality of image units into the at least one second subset of the plurality of image units according to a predetermined number of additional information processing apparatuses to which the unprocessed plurality of image units are to be sent.

13. An information processing apparatus, comprising:
    a memory configured to store a plurality of images, the plurality of images being received or generated by the information processing apparatus;
    at least one processor configured to separate the plurality of images into a first plurality of image units;

to assign sequence identifiers to the first plurality of image units;

to receive a second plurality of image units;

to process a first subset of one of the first and second plurality of image units;

to divide the one of the unprocessed first and second plurality of image units into at least one second subset of the one of the first and second plurality of image units; and a sending unit configured to send each of the at least one second subset of the one of the first and second plurality of image units to a different information processing apparatus for processing.

14. The information processing apparatus according to claim 13, further comprising:

a receiving unit configured to receive the processed at least one second subset of the first plurality of image units, wherein the at least one processor is configured to combine the processed first and second subsets of the first plurality of image units in an order based on the sequence identifiers.

15. The information processing apparatus according to claim 13, wherein the at least one processor is configured to separate the plurality of images into a plurality of image units corresponding to pages of a scanned document; and to perform optical character recognition on the first subset of the one of the first and second plurality of image units.

16. The information processing apparatus according to claim 13, wherein the sending unit is configured to send a job request message to each different information processing apparatus, the job request message including information defining a number of image units to be processed by the respective different information processing apparatus and a number of additional information processing apparatuses to which unprocessed image units are to be sent.

17. The information processing apparatus according to claim 14, wherein the receiving unit is configured to receive, and the sending unit is configured to send, a job result message, the job result message including at least one processed image unit and a corresponding sequence identifier.

18. The information processing apparatus according to claim 13, wherein the at least one processor is configured to determine whether the number of the one of the first and second plurality of image units is greater than the number of the first subset of the one of the first and second plurality of image units and, based on a determination that the number of the one of the first and second plurality of image units is greater than the number of the first subset of the one of the first and second plurality of image units, to divide the one of the first and second unprocessed plurality of image units into the at least one second subset of the one of the first and second plurality of image units according to a predetermined number of additional information processing apparatuses to which the one of the first and second unprocessed plurality of image units are to be sent.

19. The information processing apparatus according to claim 13, wherein the receiving unit is configured to receive, from another information processing apparatus, a subset of one of the at least one second subset of the first plurality of image units sent to the different processing apparatus.

20. The information processing apparatus according to claim 13, wherein the same process is performed on the first subset of the one of the first and second plurality of image units by the at least one processor and on each of the at least one second subset of the one of the first and second plurality of image units by the respective different information processing apparatus.

* * * * *